United States Patent [19]

Carrington et al.

[11] Patent Number: 4,487,121
[45] Date of Patent: Dec. 11, 1984

[54] FAULT PROTECTION SYSTEM FOR A LINE PRINTER

[75] Inventors: James E. Carrington, Vestal; John S. Gregor; Gerald R. Westcott, both of Endicott, all of N.Y.

[73] Assignee: International Business Machines Corporation, Armonk, N.Y.

[21] Appl. No.: 574,828

[22] Filed: Jan. 30, 1984

[51] Int. Cl.³ .............................. B41J 1/18; B41J 3/42; H02H 3/00
[52] U.S. Cl. .................................. 101/93.14; 361/93; 400/74
[58] Field of Search ............... 101/93.14, 93.03, 93.29, 101/93.13; 400/74; 361/93, 94, 87, 102

[56] References Cited

U.S. PATENT DOCUMENTS

| 3,589,282 | 6/1971 | King | 101/93.13 |
| 3,872,788 | 3/1975 | Palombo | 101/93.14 |
| 4,315,297 | 2/1982 | Kobayashi et al. | 361/93 X |
| 4,317,412 | 3/1982 | Bolcavage et al. | 101/93.14 |
| 4,448,123 | 5/1984 | Fleek et al. | 101/93.14 X |

FOREIGN PATENT DOCUMENTS

| 3022371 | 12/1981 | Fed. Rep. of Germany | 400/74 |
| 629584 | 9/1978 | U.S.S.R. | 361/93 |

OTHER PUBLICATIONS

"Hammer Firing Control in Belt Printers" IBM Technical Disclosure Bulletin, vol. 20, No. 4, Sep. 1977, pp. 1319-1320.

"Checkpointing for Printer Restart (Sequence Number Method)" IBM Technical Disclosure Bulletin, vol. 24, No. 4 Sep. 1981, pp. 1893-1895.

"Error Detection Capabilities in Microprocessors" IBM Tech. Disclosure Bulletin, vol. 22, No. 10, Mar. 1980, pp. 4485-4487.

"Amplifier & Load Protection & Failure Detection via Current Sensing" IBM Tech. Disc. Bulletin, vol. 18, No. 7, pp. 2073-2075, 12/75.

Primary Examiner—E. H. Eickholt
Attorney, Agent, or Firm—John S. Gasper

[57] ABSTRACT

A fault protection system for impression devices of a printer detects fault current in the impression devices during non-print operation, checks the impression devices individually to determine the location of the fault and then disconnects the impression devices from the power supply. The fault protection system also includes means for recording the fault location data in a storage means which can be called out for later use in repairing the impression devices.

17 Claims, 8 Drawing Figures

FAULT PROTECTION SYSTEM FOR A LINE PRINTER

FIELD OF THE INVENTION

This invention relates to protection devices and particularly to a fault protection system which protects electromagnetic devices such as print hammers or other impression devices used in printers.

CROSS REFERENCE TO RELATED APPLICATIONS

Application of D. A. Dayger, M. D. Hryck, D. W. Skinner, and G. R. Westcott entitled "Control System For Timing Hammers of Impact Printers", Ser. No. 338,709, filed Jan. 11, 1982.

Application of J. E. Carrington and G. R. Westcott entitled "Scan Correction For A Line Printer Having Multi-Pitch Type Carriers", Ser. No. 453,012, filed Dec. 27, 1982.

BACKGROUND OF THE INVENTION

High speed printers of the type in which this invention is most useful generally comprise a plurality of electromagnetically operated print hammers which strike individual type on a revolving type carrier such as a flexible belt or a rotating drum. A solenoid actuating coil respectively associated with each hammer operates the hammer when the coil is energized by an electronic drive circuit. The actuating coils and their drive circuits are connected via a circuit breaker to a current source for that purpose. The print control, which may include an electronic data processor device such as a microprocessor, selectively operates the print hammers in a random sequence to record a line of characters received from a data processing machine onto a record medium which is then incremented on one or more line spaces at the completion of printing. In printers using a flexible type belt, the type pitch and the hammer pitch differ so that the type aligns with the hammers in sub-scan sequences. The control system includes scan circuitry which options the drive circuits in the same sub-scan sequences. The same scan circuitry reads binary coded print data from a buffer for comparison with binary coded signals indicating the characters on the type belt. When comparisons occur, hammer fire signals are generated which turn on the optioned drive circuits to energize the coils with current from the power source for selected hammer operation. The drive circuits, when turned on, generate a feedback signal also called an echo signal. Among other things the echo signals are used during printing by checking circuitry for individually checking the hammer operation.

Periodically during the life of an impact printer, a fault condition associated with a specific print position may occur when the machine is operating in the non-print mode. Such a condition can occur during start up and prior to a print command or between print commands from the processor. Previous printer control systems provide means for sensing an electrical fault when not printing and immediately disconnecting power to protect the hammer units. The location and identification of the fault is done sometime later when the location of the fault becomes more difficult and, in cases where the fault is intermittent, impossible. The difficulty of locating the fault is even greater in those printers where the operating circuits and controls are part of an integrated circuit package having a large number of operating circuits and electrical connections on a single substrate or printed circuit device.

Background Art

U.S. Pat. No. 3,589,282 describes a device for protecting print hammers of a high speed line printer from excess current. The device comprises a circuit that compares the current in all the hammer drive coils simultaneously with a signal of a predetermined level. The device operates a relay to disconnect power from the hammer circuits if a current is detected in the hammer circuits when they are not firing. The patent describes a fault location method in which the hammer circuits are packaged on individual printed circuit boards and the circuit boards are individually disconnected from the power source until the comparison circuit ceases to generate a fault signal.

U.S. Pat. 3,748,537 describes a protection device for hammer circuits that monitors the voltage levels at an appropriate terminal of each circuit. The device generates a signal which interrupts the power supply if it detects a voltage level outside predetermined limits.

IBM Technical Disclosure Bulletin, Vol. 13, No. 2, July 1970, pp. 348–8 shows a magnet coil protection and armature seal detection circuit which detects the application of improper current to the print magnets when printing is not occurring.

SUMMARY OF THE INVENTION

This invention makes it possible to detect and locate faults before power is disconnected. The invention makes it possible to locate faults which are of very short duration and which may be of the intermittent variety. Basically, the invention provides a fault protection device for impression devices of a printer which detects fault current in the impression devices during non-print operation, then checks the impression devices individually to determine the fault location and then disconnects the impression devices from the source of current. Preferably, the invention uses scan circuitry activated by fault current detection means to scan the impression devices individually to determine the fault location and circuit breaker means operated at the end of a single scan to disconnect the impression devices from the current source. In the preferred form of the invention, the scan circuitry is the same scan circuitry which is normally used during printing to option the impression devices for selective operation in synchronism with the movement of the type carrier and is activated during non-printing to scan the impression devices to locate the fault condition when detected. Thus, additional check apparatus is not needed. The invention further provides a unique multiplexer arrangement operated by a logic switching device for detecting fault current in any of the impression devices and then in response to a fault signal operates the multiplexer to cause the impression devices to be individually scanned to determine the location of the fault current after which the impression devices are then disconnected from the power source. The invention also provides record means such as a storage device scanned by the scan circuitry and operable in response to fault signals produced by the multiplexer for storing data identifying the location of the impression device producing the fault signal. In the preferred form of the invention the storage device is a random access storage device such as a check buffer and is scanned by the same scan circuitry during printing to store error data indicative of incorrect operation such as hammer misfire. The protection device can further include means for reading the check buffer and displaying the fault data after power is disconnected to identify the location of the fault.

Thus the invention makes it possible to determine the location of faults in very short time. Intermittent faults of very short duration can also be detected and located. Time consuming testing of the print hammers after shutdown is eliminated. The time consuming trial and error technique of disconnecting circuit boards is avoided. Also, the invention makes it possible to locate fault conditions even where highly integrated hammer control circuitry and packaging is used.

The foregoing and other objects, features and advantages of the invention will be apparent from the following more particular description of a preferred embodiment of the invention, as illustrated in the accompanying drawing.

DETAILED DESCRIPTION OF THE INVENTION

Figure 1:
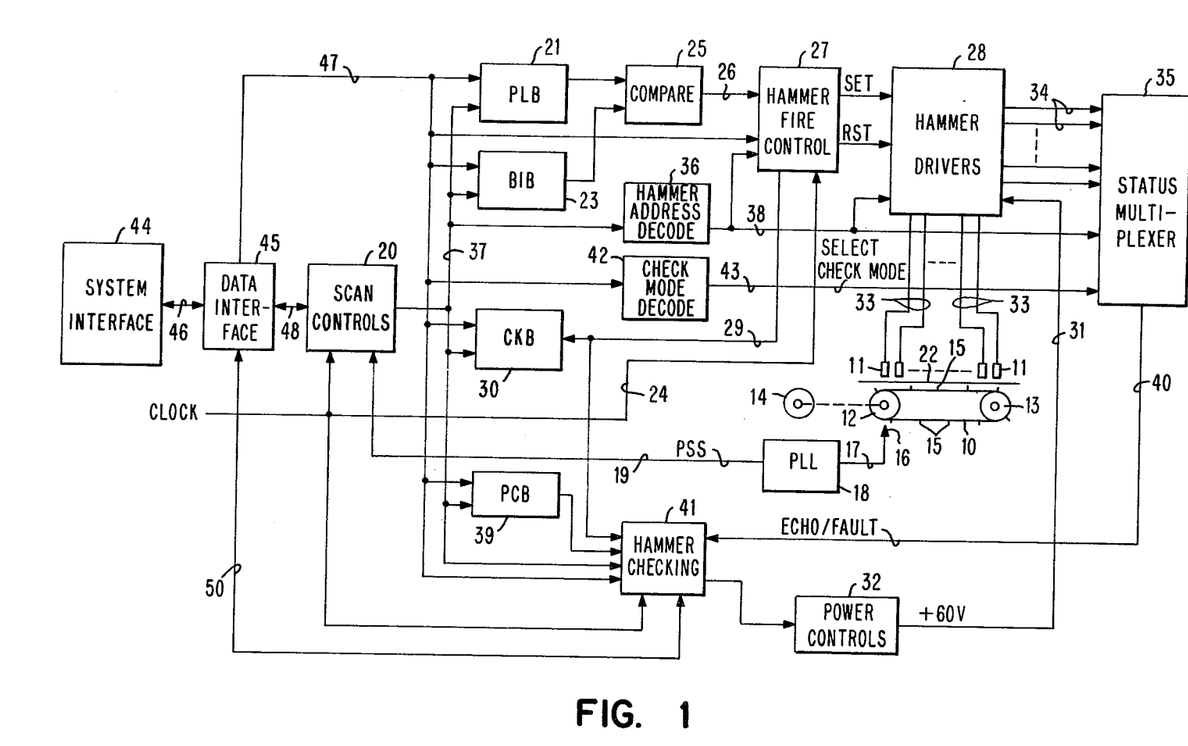
FIG. 1 is a schematic diagram showing the overall arrangement of a type of control system for a printer which incorporates the invention.

A printer system for practicing this invention essentially comprises a print mechanism and an electronic print control. As seen in FIG. 1, the print mechanism has a continuous flexible metal type band 10 and a row of uniformly spaced electromagnetically operable print hammers 11 arranged in the vicinity of and parallel with a straight portion of type band 10. Type band 10 is supported by rotatable drive pulleys 12 and 13 driven by motor 14 operating at constant speed. Motor 14 may be a DC motor of any well known type. Engraved type elements 15 such as characters or other graphic symbols are spaced uniformly around band 10 at a character pitch which differs from the pitch of hammers 11. Due to the pitch differential between hmnmers 11 and characters 15, the characters align as subscan groups with subscan groups of hammers 11 during continuous band motion in accordance with a plurality of continuously repeated scan and subscan sequences. The number of subscans per scan and the alignment sequences depend on the pitch ratio of characters 15 and hammers 11. The scan/subscan principle of operation is well known and further detailed information may be obtained by reference to the cross referenced application of J. E. Carrington and G. R. Westcott. In a particular arrangement described therein the pitch differential is such that there are four subscans in a subscan.

Band 10 has timing marks (not shown), which may also be engraved, for sensing by transducer 16 which generates emitter pulses on line 17 to be used for timing the operation of the print control with the motion of type band 10 for the ultimate firing of hammers 11. Emitter pulses are generated by transducer 16 preferably at the rate of one pulse per print scan. The emitter pulses are multiplied by phase locked loop PLL 18 for supplying PSS pulses on line 19 to scan controls 20 of the print control.

The electronic print control as shown in FIG. 1 may be considered to comprise a print control and a check control which are interrelated. The print control comprises the following:

PLB 21—The print line buffer is a random access READ/WRITE electronic memory device. PLB 21 stores binary coded signals representing graphic symbols arranged in the order they are to appear when printed at corresponding print positions in a line of data on a print medium 22 by operation of hammers 11. PLB 21 would have at least as many storage positions as there are print hammers 11, e.g. 168.

BIB 23—The band image buffer is a random access READ/WRITE electronic memory device. BIB 23 stores binary coded signals representing the individual characters 15 in the order in which they are arranged on type band 10. BIB 23 has at least as many storage positions as there are graphic symbols in a complete set of characters 15 on type band 10. The number of storage locations in BIB 23 depends on the number of characters on type band 10.

Scan controls 20—Scan controls 20 comprise address logic circuitry for producing address signals in straight or subscan sequence on command in combination with PSS pulses on line 19 and clock pulses on line 24. Scan controls 20 comprise two sets of addressing circuits, one set for producing addresses in the sequence in which hammers 11 are to be optioned and the other set for producing addresses in the sequence in which the characters 15 become available to be printed on print medium 22. In the particular embodiment previously described, the hammer address circuits of scan controls 20 produce address signals during print operation and during fault checking in subscan sequence whereby there are four subscans for a single scan. Reference is made to the aforementioned application of J. E. Carrington and G. R. Westcott for a more complete description of the design and operation of the scan controls 20. In addition to the address signal generating circuits, scan controls 20 include control circuit devices to be described more fully hereinafter which function for producing control signals used for fault detection location and protection of the print hammers 11 during non-print operation of the control system. Scan controls 20 include a subscan counter which counts PSS pulses used for indicating the end of a single scan operation of scan controls 20 for the purpose of terminating the operation of the hammer addressing circuits of scan controls 20.

Compare circuit 25—This circuit compares binary coded signals read from PLB 21 and BIB 23 by scan controls 20. Compare circuit 25 produces an EQUAL compare signal on line 26 for use by hammer fire controls 27 when the character data from PLB 21 and BIB 23 coincide.

Hammer fire control 27—This block contains the circuitry which generates Initiate Fire signals in response to the EQUAL compare signals from compare circuit 25 and produces SET and RST signals for turning hammer drivers 28 on and off to operate hammers 11 for a controlled time period. The block also contains circuitry for setting a hammer latch which generates a status signal on bus 29 to be used for setting a Fired status bit used for checking hammer operation. Hammer fire control 27 might also include counter and storage devices for controlling delay periods preceding hammer firing as well as the time the driver circuits are turned on. This block also includes circuitry for resetting the hammer latch which generates status signals on bus 29 for setting a Handled status bit in check buffer 30 for use in checking the operation of hammers 11. A more complete description of the structure and operation of hammer fire control 27 may be obtained by reference to the aforementioned application of D. A. Dayger et al.

Hammers drivers 28—This block contains the hanmer driver and associated circuits for each of the print hammers 11 which, when operated by SET and RST signals from hammer fire control 27, switch operating current received on line 31 from a power source in power controls 32 onto lines 33 to the operating coils of hammers 11. Power controls 32 include a circuit breaker device which connects a power source with line 31. The hammer driver circuits may take various forms but preferably comprise constant energy drive circuits of the type disclosed and claimed in U.S. Pat. No. 4,408,129 issued Oct. 4, 1983 to R. W. Arnold and D. W. Skinner. The individual driver circuits of hammer drivers 28 have terminal connections to status lines 34 for supplying status signals to status multiplexer 35. Status signals are put on status lines 34 in response to operating current in the individual driver circuits of hammer drivers 28 in response to a SET signal from hammer fire control 27 or in response to a fault current present in the driver circuit due to an electrical failure in the driver circuit or its related hammer operating coil.

Hammer address decode 36—This block contains logic circuitry which decodes hammer address signals received from scan controls 20 on bus 37 and generates hammer SELECT signals on bus 38 for scanning hammer fire controls 27, hammer drivers 28, and multiplexer 35 to respond to EQUAL compare, SET, RESET, and status signals respectively. Reference is made to the aforementioned application of D. A. Dayger et al for further details of the structure and operation of the hammer address decode 36 and bus connections with hammer controls 27, hammer drivers 28 and status multiplexer 35.

The check control of the electronic control system as shown in FIG. 1 comprises the following:

CKB 30—The check buffer is a random access READ/WRITE electronic memory device. CKB 30 stores status and error data relating to the operation of print hammers 11 and associated operating circuits. CKB 30 has as many storage locations as there are print hammers 11 and is addressed in the same sequence as PLB 21 by scan controls 20. The status and error data comprise multiple bit binary coded words, individual bits of which are designated as either status or error bits. In the preferred form in which the invention is practiced, the status data comprises status words having Enabled, Fired and Handled bits. The error data comprises error words having Failure and Misfire bits.

The Enabled bit in a status word indicates a printable character, i.e. a character available on the type band 10 which is to be printed. The Fired bit in a status word stored in CKB 30 indicates that a driver circuit in hammer drivers 28 has been turned on in response to a SET signal from hammer fire controls 27 to operate a selected hammer 11. A Handled bit in a status word stored in CKB 30 indicates that a driver circuit is off.

PCB 39—The print control buffer is a random access READ/WRITE electronic memory device. PCB 39 stores multiple bit binary coded data relating to various operations of the print control system. PCB 39 has at least as many storage locations as there are print hammers 11 and is addressed in the same sequence as PLB 21 by the hammer address circuits of scan controls 20. PCB 39 is operated to store control words one of which is the incremental hammer check count IHCC. IHCC is a multiple bit binary coded word which indicates the number of scans occurring over a period of time during the operation of each print hammer 11 during printing as will be described more fully hereinafter.

Status Multiplexer 35—This block contains the logic circuitry for receiving status signals on lines 34 and generating ECHO/FAULT signals on line 40 to hammer checking 41. In accordance with this invention, status multiplexer 35 operates in either of two check modes in response to CHECK MODE signals supplied on command by check mode decode 42 on bus 43. In check mode 1, status multiplexer 35 in response to a CHECK MODE 1 signal from select mode decode 42 operates to generate an ECHO signal on line 40 in response to a status signal on a line 34 when enabled by SELECT signals applied to bus 38 by hammer address decode 36. This is the basic mode of operation of status multiplexer 35 for checking hammer operation during printing. In check mode 2, status multiplexer 35 in response to a CHECK MODE 2 signal from check mode decode 42 generates a Fault signal on line 40 in response to a fault current status signal on any of the status lines 34 from hammer drivers 28.

Hammer checking 41—This block contains logic circuits and control elements responsive to ECHO signals on line 40 from multiplexer 35 for checking the operation of hammers 11 during printing. Hammer checking 41 also contains the control element responsive to FAULT signals on line 40 from status multiplexer 35 for activating the scan controls 20 and the checking controls during non-print operation for locating the fault condition as indicated by status signals on lines 34 from hammer drivers 28. Hammer checking 41 also contains the control elements which operate the circuit breaker of power controls 32.

As seen in FIG. 1, the print control system further comprises system interface 44, which may have a microprocessor, and data interface 45 interconnected by a two way communication bus 46. Two way bus 47 connects data interface 45 with PLB 21, BIB 23, CKB 30, PCB 39, hammer fire controls 27, hammer checking 41 and check mode decode 42 for communicating print, character and control data and associated commands for performing print, checking and fault location operations. A two way bus 48 interconnects data interface 45 and scan controls 20 for communicating Load, Print and other control signals for controlling the operation of the scan controls 20 to perform controlled scanning as part of the loading, printing, checking and fault location operations. Control signals related to hammer checking, fault detection and operation of power controls 32 are supplied between data interface 45 and hammer checking 41 via two way bus 50.

Figure 2:
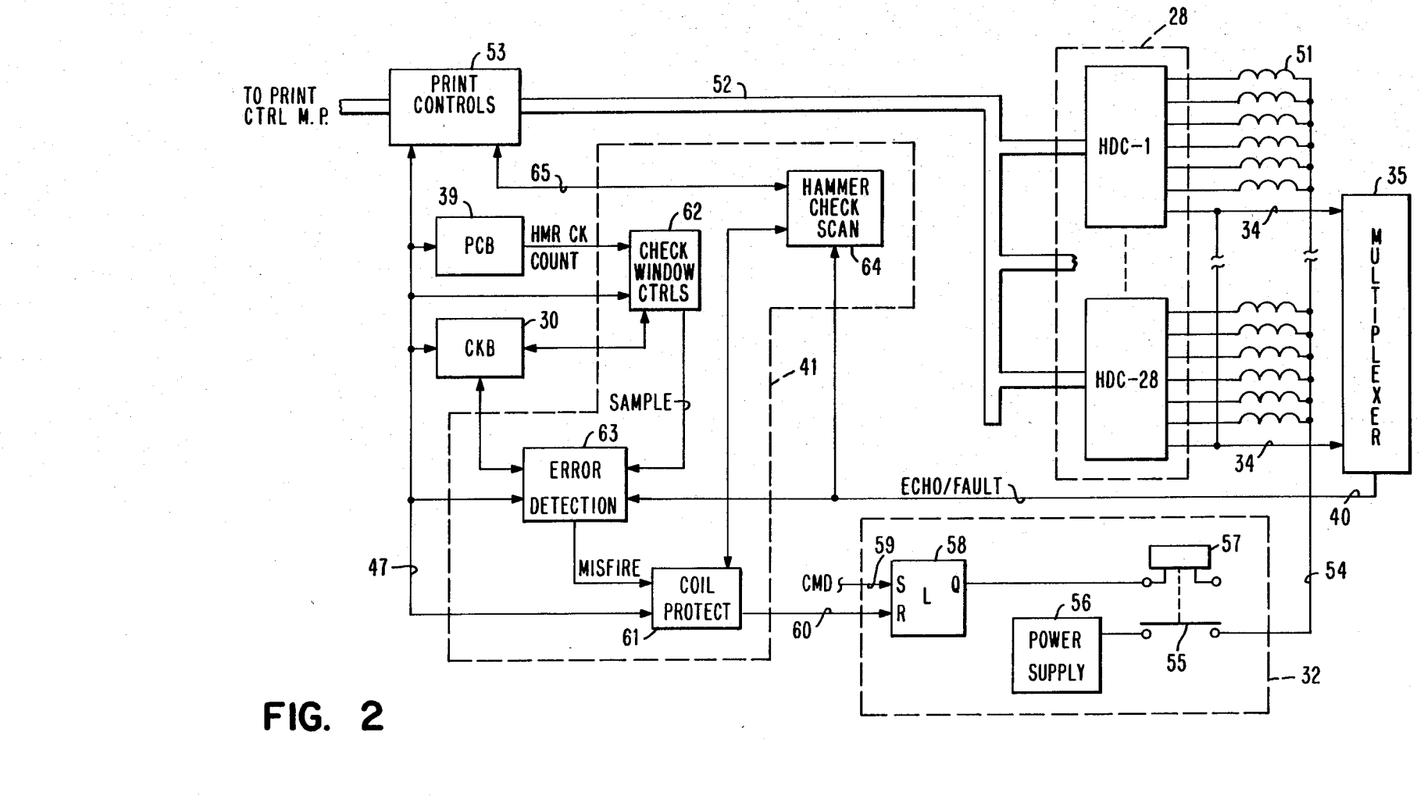
FIG. 2 is a schematic diagram showing details of the hammer checking and protection devices of the system of FIG. 1.

Further details of the print control system can be seen in FIG. 2. As shown, hammer drivers 28 comprise hammer driver cards HDC-1 through HDC-28, each having six driver circuits connected to hammer coils 51, numbered 1 through 168 and each connected by bus 52 to receive the SET, RST, ADDRESS, and CLOCK signals as previously described from the print controls generally indicated as block 53. Coils 51 are each coupled in series by line 54 to power controls 32 comprised of circuit breaker 55, dc power supply 56, relay coil 57 and power latch 58. Circuit breaker 55 is closed when relay coil 57 is energized by a command signal on line 59 of bus 50 to the S input of latch 58 and is opened when relay coil 57 is de-energized by latch 58 being reset in response to a control signal on line 60 from coil protect latch 61 of hammer checking 41.

As shown in FIG. 2, each of the hammer driver cards HDC-1 through HDC-28 has an output connection to a status line 34 for supplying card status signals to multiplexer 35 which produces group ECHO/FAULT signals on line 40. As seen in FIG. 2, hammer checking 41 comprises check window controls 62, error detection circuits 63, coil protect latch 61 and hammer check scan 64. Data and/or commands for checking the operation and protection of hammers 11 is provided to PCB 39, CKB 30, error detection circuits 63 and coil protect latch 61 by print controls 53 via bus 47 and via bus 65 to hammer check scan 64.

Figure 3:
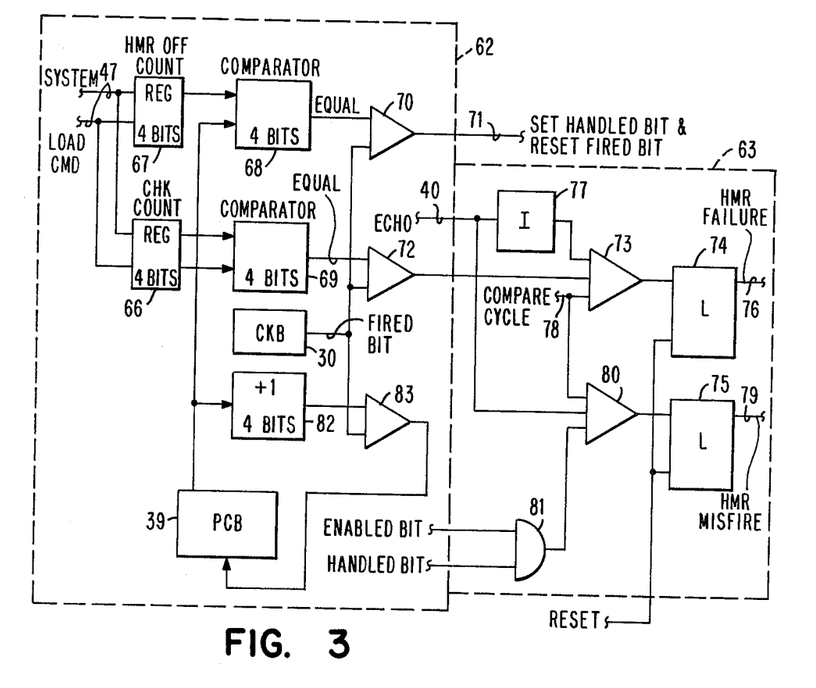
FIG. 3 is a logic diagram showing further details of the hammer checking portion of FIG. 2.

As seen in FIG. 3, check window controls 62 comprises registers 66 and 67 having outputs connected to first inputs of comparators 68 and 69 respectively. The second inputs of comparators 68 and 69 are connected to the read out register of PCB 39. Register 66 stores a hammer check count HCC received on data bus 47 along with a Load command from data interface 45 (see FIG. 1). HCC is a binary count in terms of a predetermined number of scans which establishes a check window after which a check is made to determine whether a hammer driver has been fired in response to an EQUAL signal from compare circuit 25 (see FIG. 1). The magnitude of HCC is dependent on the speed of the type belt 10 and is selected to allow for a time delay interval following the Initiate Fire signal by hammer fire control 27. Register 67 stores a hammer off count HOC received with a Load command on data bus 37 from data interface 45. HOC is a binary count in terms of a second predetermined number of scans which establishes a window after which a check is made to determine whether the selected hammer driver of hanmer drivers 28 has been turned off in response to a RST signal from Hammer Fire Control 27. Compare circuit 69 each option time compares HCC in register 66 with the IHCC read from PCB 39 and if coincidence exists generates an EQUAL signal which gates the Fired bit read from CKB 30 through AND circuit 72 to produce a Hammer Failure sample.

Compare circuit 68 each option time compares the HOC register 67 with the IHCC in PCB 39 and if coincidence exists generates an EQUAL signal which gates a Fired bit from CKB 30 through AND circuit 70 which resets the Fired bit and sets the Handled bit in CKB 30.

The error detection circuits 63 of FIG. 2 as seen in FIG. 3 comprise failure detection latch 74 and misfire detection latch 75. Latch 74 operates to produce a HMR FAILURE signal on line 76 if an ECHO signal is not present on line 40 to inverter 77 during printing operation as indicated by a Compare Cycle on line 78 to AND circuit 73 when the output from AND circuit 72 indicates a Hammer Failure sample should occur. Latch 75 operates to produce a HMR MISFIRE signal on line 79 for communication to data interface 45 if an ECHO signal is present on line 40 and is gated through AND circuit 80 by a Compare Cycle signal on line 78 and either a Handled bit or Enabled bit from CKB 30 is applied through OR circuit 81 to AND gate 80.

As previously described, PCB 39 stores an IHCC for each hammer position for the purpose of indicating the time interval in scans during which the hammer drivers 28 are turned on. As previously described, a Fired bit is stored in CKB 30 in response to a setting of the hammer latch in hammer fire control 27 when a SET signal is generated. IHCC is updated each scan thereafter until the Fired bit is removed from CKB 30 and a Handled bit written at that storage location. The means to do this comprises adder 82 with input connection from PCB 39 for receiving IHCC for each addressed position. Adder 82 increments IHCC by a count of 1. A Fired status bit read from CKB 30 gates the increased IHCC through AND circuit 83 for writing into PCB 39. When the Fired bit of the status word is replaced with a Handled bit, the IHCC stored in PCB 39 remains unchanged.

Figure 4:
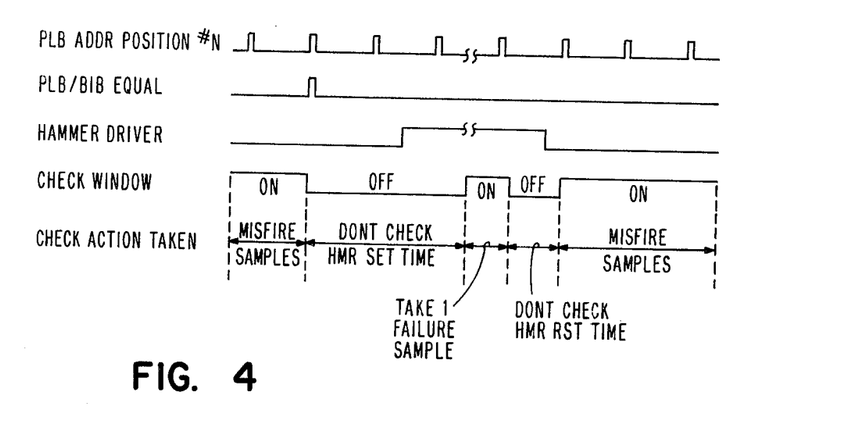
FIG. 4 is a timing chart explaining the operation of the hammer checking portion described in FIG. 3.

The check window controls of FIG. 3 operate to perform hammer failure and misfire checking during a window period of each hammer option time. FIG. 4 shows the timing for hammer checking during a check window interval and its occurrence in relation to addressing of PLB 21, PLB21/BIB23 EQUAL, and operation of the hammer driver circuits of HD-1 through HD-28 by hammer fire control 27 as previously described.

Referring again to FIG. 2 it will be seen that hammer checking 41 includes coil protect latch 61 having an output connected to the reset input R of power latch 48. A hammer MISFIRE signal from latch 75 (see FIG. 3) of detection circuit 63 as a consequence of the operation of window controls 62 resets latch 58 to de-energize relay coil 57 causing circuit breaker 55 to open thereby disconnecting the hammer coils 51 and hammer driver cards HDC-1 through HDC-28 from power supply 56. In the event of either a MISFIRE signal or a FAILURE signal being generated by the detection circuits 63 during printing, the print controls 53 are further operated to store Misfire or Failure bits in CKB 30 for subsequent readout and communication through data interface 45 to external system devices for display and operator attention.

Figure 6:
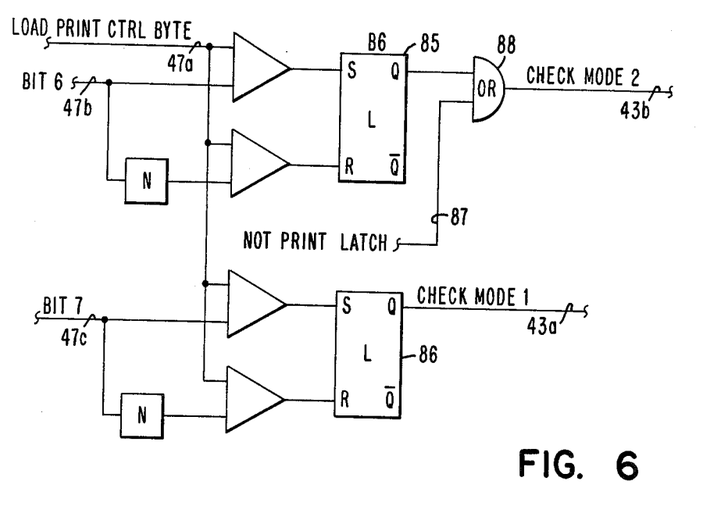
FIG. 6 is a circuit diagram showing the check mode decode logic for operating the status multiplexer to perform fault current detection and location in the non-print mode of operation of the control system of FIG. 1

Check Mode Decode 42—This block contains the logic for decoding binary coded commands generated from data interface 45 on bus 47 for the purpose of applying CHECK MODE signals via control lines of bus 43 to multiplexer 35. As seen in FIG. 6, check mode decode 42 comprises latches 85 and 86 selectively switched into either of two bistable states by the combination of a Load Print CTRL Byte command on line 47a and binary signal Bits 6 and 7 of the Print Control Byte on lines 47b and 47c respectively. A CHECK MODE 1 signal is active on control line 43a of bus 43 when Bit 7=1. A CHECK MODE 2 signal is gated through OR circuit 88 onto control line 43b of bus 43 when Bit 6=1 or a NOT PRINT LATCH signal is present on line 87. In accordance with the preferred manner in which the invention is practiced, multiplexer 35 is conditioned by a CHECK MODE 2 signal on line 43b for detecting current in any of the hammer drivers 28 or associated coils 11 caused by an electrical fault and for producing a FAULT signal on line 40 during the non-printing operation of the print control system. Multiplexer 35 is conditioned by the CHECK MODE 1 signal on line 43b for scanning by SELECT signals from hammer address decode 36 on individual lines of bus 38 for checking the status of hammer drivers 28 during printing and for determining the location of the fault current in response to a FAULT signal during non-print operation.

Figure 5:
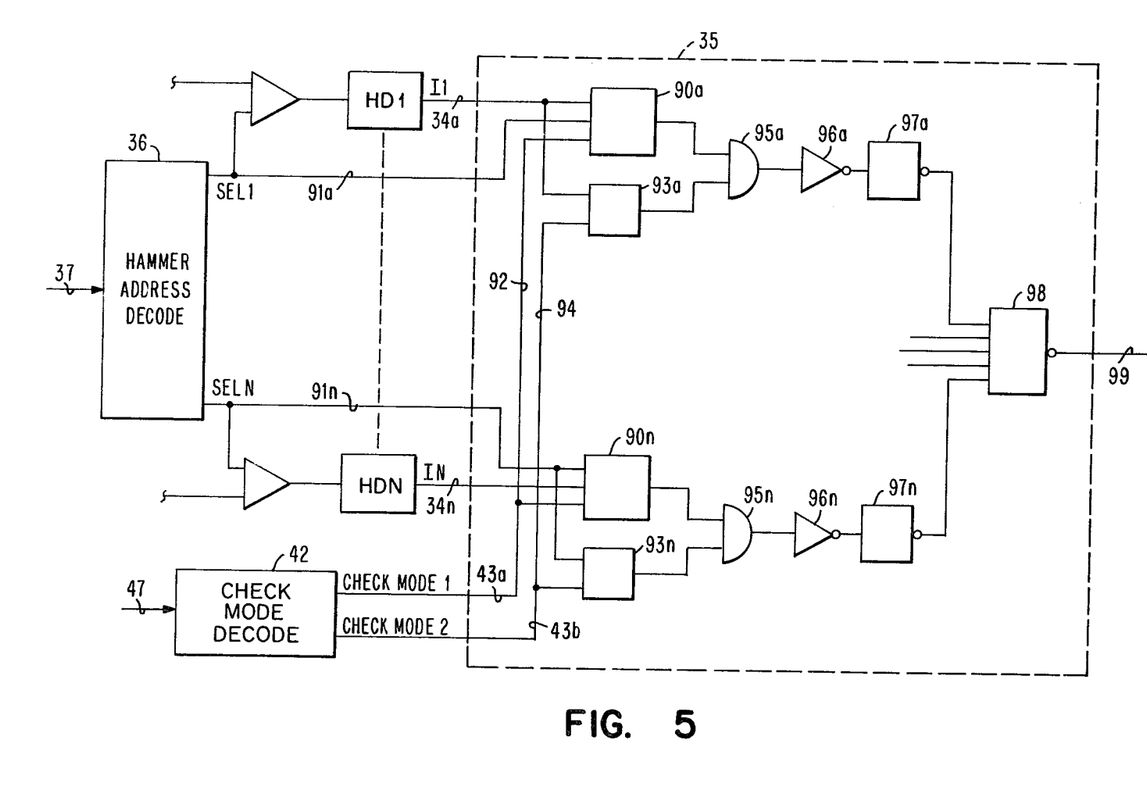
FIG. 5 is a circuit diagram showing details of the status multiplexer portion of the hammer checking and protection controls of the system of FIG. 1.

As seen in FIG. 5, status multiplexer 35 comprises a first series of NAND circuits 90a-n each having a first input connected by status lines 34a-n for receiving status signals I1-IN from hammer drivers HD1-HDN of a HDC-x. NAND circuits 90a-n have second inputs connected for receiving on lines 91a-n hammer SELECT signals SEL1-N converted from hammer address signals on bus 37 from scan control 20 to hammer address decode 36. A third input of NAND circuits 90a-n is connected via common line 92 to line 43a of bus 43. Status multiplexer 35 includes a second series of NAND circuits 93a-n each having a first input for receiving status signals I1-IN from hammer drivers HD1-HDN of HDC-x. A second input of NAND circuits 93a-n is connected by common line 94 to line 43b of bus 43. The outputs of NAND circuits 90a-n and 93a-n are connected through OR circuits 95a-n and inverters 96a-n to individual inputs of NOR circuits 97a-n through OR circuit 98 to card status line 99. Card status line 99 may be one of several card status lines from other haamer driver cards HDC1-N of hammer drivers 28 which in turn are connected through additional combinatorial logic to produce ECHO/FAULT signals on line 40 as previously described.

A CHECK MODE 1 signal from check mode decode 42 on line 43a, in response to a command on bus 47 from data interface 45, conditions NAND circuits 90a-n for individual scanning by SEL1-N signals for gating status signals I1-N from hammer drivers HD1-HDN through NAND circuits 90a-n and the remainder of the circuit paths onto card status line 99. A CHECK MODE 2 signal from check mode decode 42 on line 43b, in response to a command from data interface 45, simultaneously conditions all NAND circuits 93a-n for gating any of the status signals I1-IN from HD1-HDN through NAND circuits 95a-n and the selected circuit path onto card status line 99 to send a FAULT signal on line 40 to hammer checking 41.

In accordance with the practice of the invention, a CHECK MODE 1 signal is generated by check mode decode 42 on command from data interface 45 prior to the time a PRINT GO signal on bus 46 activates scan controls 20 to begin scanning PLB 21, BIB 23 to print data previously stored in PLB 21. Simultaneously with the scanning of PLB 21, scan controls 20 also scans CKB 30, PCB 39 and multiplexer 35 to cause hammer checking 41 to repeatedly sample the condition of line 40 to check each hammer circuit individually with the check data stored in CKB 30. Depending on the condition of line 40 when sampled by hammer checking 41, the check data in CKB 30 is updated with the appropriate status word as hammer drivers 28 are turned on and off by SET and RST signals as printing progresses. Upon completion of the print cycle (assuming no error condition resulting in detection latches 74 and 75 of hammer checking 41 being operated), on command from data interface 45 scan controls 20 cease scanning multiplexer 35, PLB 21, CKB 30 and PCB 39, and check mode decode 42 is operated to apply a CHECK MODE 2 signal on line 43b to condition NAND circuits 93a-n for detection of any status current I1-IN on status lines 34a-n whereby detection circuits 63 and hammer check scan 64 of hammer checking 41 may be conditioned by a FAULT signal from multiplexer 35 on line 40. Upon completion of the print cycle and assuming no error condition has been detected and recorded, CKB 30 will have status words at all print hammer positions containing Handled bits which will be changed to Enabled bits in the course of loading PLB 21 with new print data as previously described.

In the event a fault condition occurs in any of the hammer driver circuits HD1-N during the non-print interval, a status signal I1-IN will be generated on at least one of the status lines 34a-n to be gated directly through NAND circuits 90a-n onto card status line 99 resulting in a FAULT signal on line 40. In response to the FAULT signal, hammer check scan 64 is activated which switches check mode decode 42 to check mode 1 whereby a CHECK MODE 1 signal is applied to line 43a and causes scan controls 20 to begin scanning multiplexer 35, CKB 30 and PCB 39 to determine and record the location of the fault current. Upon completion of a single scan operation, scanning by scan controls 20 is terminated and circuit breaker 55 operated to disconnect power supply 56 to hammer drivers 28. Although the fault condition may be of short duration, the scanning, location, recording and disconnect operations can occur within a short interval. In this manner transient faults are detectable and coils protected by a quick disconnect.

Figure 7:
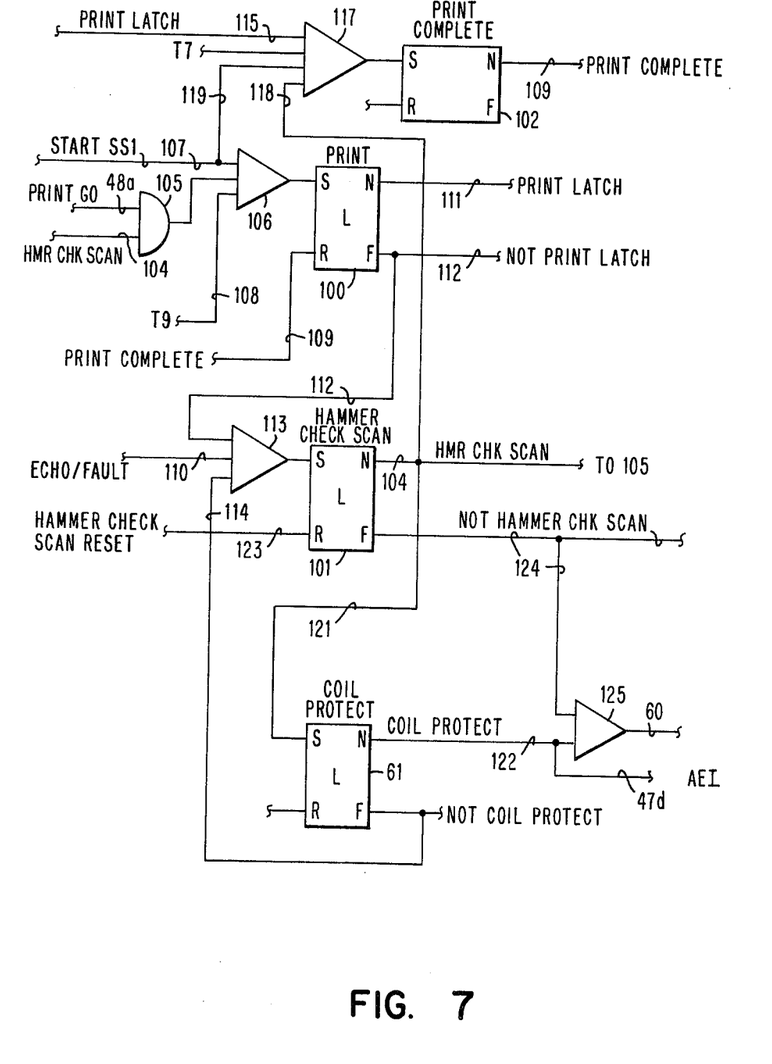
FIG. 7 is a circuit diagram showing various control elements which are part of the address controls for controlling the scan operation.

As seen in FIG. 7, a specific control arrangement for locating and recording fault conditions comprises print latch 100 for controlling the start and end of the print cycle and hammer check scan latch 101 operable during the non-print interval for operating print latch 100 to activate scan controls 20 and for controlling the activation of the data interface 45 to switch check mode decode 42, to condition multiplexer 35 for scanning by scan controls 20 to locate fault currents during the non-print interval. The control arrangement of FIG. 7 also includes print complete latch 102 for stopping the scan controls 20 and disconnecting the hammer drivers 28 from power supply 56 at the end of a single scan and a coil protect latch 61 which resets power latch 58 to operate relay coil 57 to open circuit breaker 55 as previously described. Print latch 100, which may be part of scan controls 20, is set by either a PRINT GO signal supplied on line 48a by data interface 45 or a HMR CHK SCAN signal supplied on line 104 by hammer check scan latch 101 to OR circuit 105 and gated through AND circuit 106 by a START SS1 signal supplied on line 103 from a scan counter of scan controls 20 and a T9 clock pulse on line 108. Print latch 100 is reset by a PRINT COMPLETE signal supplied on line 109 by print complete latch 102. When set by a PRINT GO signal, print latch 100 generates a PRINT LATCH signal on line 111 causing scan controls 20 to perform the sequential addressing of the various buffers and status multiplexer 35 for printing and hammer checking. When set by a HMR CHK SCAN signal, print latch 100 generates a PRINT LATCH signal on line 111 to activate scan controls 20 during the non-print interval to scan the various buffers and multiplexer 35 for locating fault currents in hammer drivers 28 and recording the results in CKB 30. When reset by a PRINT COMPLETE signal on line 109, print latch 100 drops the PRINT LATCH signal on line 111 to terminate addressing by scan controls 20 and generates a NOT PRINT LATCH signal on line 112 to condition AND circuit 113 for setting hammer check scan latch 101 in the event a FAULT signal is applied on line 40 and a NOT COIL PROTECT signal from coil protect latch 61 is present on line 114. The NOT PRINT LATCH signal is also used by data interface 45 to switch check mode decode 42 to generate CHECK MODE 2 signal to condition multiplexer 35 to detect fault currents in any of the hammer drivers 28.

When set by a FAULT signal on line 40 during the non-print interval, hammer check scan latch 101 generates a HMR CHK SCAN signal on line 104. As previously described, this results in print latch 100 being set to cause a PRINT LATCH signal to be generated on line 111 to activate the scan controls for scanning multiplexer 35, CKB 30 and PCB 39. The PRINT LATCH signal is also applied via line 115 to AND circuit 117. The HMR CK SCAN signal on line 104 is also applied via line 118 to condition AND circuit 117 so that a second START SS1 signal on line 119 representing the completion of a single scan is gated through AND circuit 117 by a T7 clock pulse to set print complete latch 102. When set, print complete latch 102 generates a PRINT COMPLETE signal on line 109 which causes a Print Complete Interrupt (PCI) to the print control microprocessor.

Figure 8:
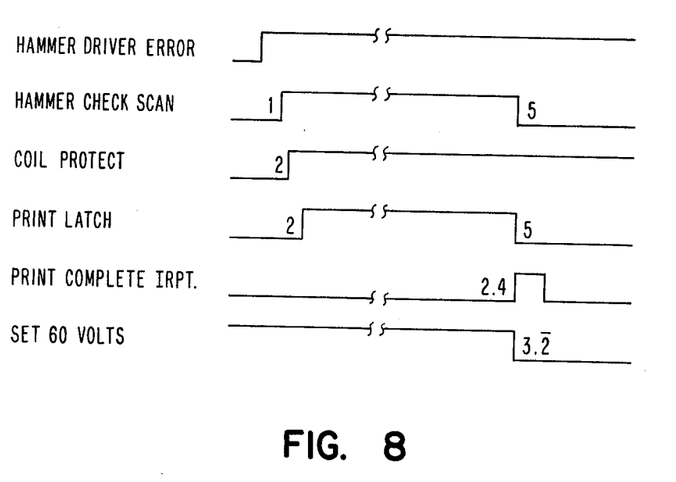
FIG. 8 is a timing diagram for explaining the operation of the hammer check scan of FIG. 7.

The HMR CHK SCAN signal generated by setting hammer check scan latch 101 is also applied on line 121 to set coil protect latch 61. When set, coil protect latch 61 generates a COIL PROTECT signal on line 122 which causes an Adapter Error Interrupt (AEI) to be sent via line 47d of bus 47 to the print control microprocessor. When the AEI is sensed, the software waits for the PCI generated by the PRINT COMPLETE signal on line 109 which signifies that the hammer check scan is complete. The software then generates a command which produces a HMR CHECK SCAN RESET signal on line 123 resetting hammer check scan latch 101 resulting in a NOT HAMMER CHK SCAN signal on line 124. This gates the COIL PROTECT signal on line 122 through AND circuit 125 onto line 60 to reset power latch 58 to operate relay coil 57 and circuit breaker 55 to disconnect hammer drivers 28 from power supply 61. The software also reads the contents of the CKB 30 searching for positions that contain Misfire bits that indicate the failing hammer position or positions that initiated the hammer check scan. This information is then logged for use by printer maintenance personnel. The sequence of operations of the control arrangement is shown in FIG. 8

Thus it can be seen that a fault detection and protection system has been provided which is fast acting to detect fault conditions of short duration and which eliminates trial and error fault location and does it in a manner which avoids duplication of controls by using existing scan and control circuitry in a novel and unique manner.

While the invention has been particularly shown and described with reference to a preferred embodiment thereof, it will be understood by those skilled in the art that various change in form and details may be made therein without departing from the spirit and scope of the invention.

We claim:

1. In a printing machine connected to a data processing means and including a plurality of electrically operable impression devices and a continuously moving type carrier, said impression devices having a connection by circuit breaker means with a power source for supplying current to said impression devices, and a print control means operable in a print operation for selectively energizing said impression devices with operating current from said source in synchronism with the movement of said type carrier to effect printing of data transmitted from said data processing means, a protection system associated with said print control means comprising detection means for sensing fault current in any of said impression devices during the non-print operation of said print control means, fault location means operable in response to a fault signal from said detection means during the non-print operation of said print control for individually checking said impression devices and identifying the origin of said fault current signal, and means operable upon completion of checking by said fault location means for operating said circuit breaker means to disconnect said impression devices from said power source.

2. In a printing machine connected to a data processing means and including a plurality of electrically operable impression devices and a continuously moving type carrier, said impression devices having a connection by circuit breaker means with a power source for supplying current to said impression devices, and a print control including means for selectively energizing said impression devices with current from said source in synchronism with the movement of said type carrier to effect printing of data transmitted from said data processing means, the improvement in said print control comprising a fault protection system operable during the non-print operation of said print control for detecting fault current in any of said impression devices, individually checking said impression devices immediately upon detection of a fault current to determine the location of said fault current and thereafter operating said circuit breaker means to disconnect said impression devices from said power source.

3. In a printing machine in accordance with claim 2 in which said print control includes scan circuitry operable during print operation of said print control for individually enabling said impression devices to effect said selective energizing of said impression devices and inoperable following completion of printing of data transmitted by said data processing machine, and said fault protection device includes means for activating said scan circuitry during the non-print operation of said print control to effect scanning of said impression devices for enabling said individual checking and determination of the location of any fault current in said impression devices, and means for operating said circuit breaker means upon completion of a predetermined scan operation of said impression devices by said scan circuitry to effect said disconnection of said impression devices from said power source.

4. In a printing machine in accordance with claim 3 in which
said scan circuitry is cyclically operable, and
said predetermined scan operation comprises a single scan of said scan circuitry.

5. In a printing machine in accordance with claim 3 in which
said protection device includes detection means operable during the non-print operation of said control system for generating a check signal in response to fault current in any of said impression devices so as to activate said scan circuitry to effect scanning of said impression devices and then for generating said check signal during scanning in response to fault current in any individual impression device for enabling said individual checking and determination of the location of fault current in said impression devices.

6. In a printing machine in accordance with claim 5 in which
said print control includes first control means for generating print or non-print signals for controlling the print and non-print operations respectively of said print control, and
said protection device further includes second control means responsive to a non-print signal from said first control means and a check signal from said detection means for generating a check scan signal for activating said scan circuitry to effect scanning of said impression devices during non-print operation of said print control.

7. In a printing machine in accordance with claim 6 in which
said detection means includes a multiplexer arrangement connected to receive fault current signals from said impression devices and to produce check signals in response thereto, and
means for selectively operating said multiplexer arrangement to detect fault current and to generate a check signal in response to fault current in any of said impression devices or to detect fault current and to generate a check signal in response to fault current in individual impression devices.

8. In a printing machine in accordance with claim 7 in which
said multiplexer arrangement has first and second input means connected for receiving fault current signals from each of said impression devices, and
said means for selectively operating said multiplexer arrangement includes switch means operable in response to a non-print signal from said first control means for connecting said first input means to said impression devices in a manner whereby said multiplexer arrangement is enabled to generate a check signal in response to fault current in any of said impression devices, and
said switch means is further operable in response to said check scan signal from said second control means for connecting said second input means to said impression devices in a manner whereby said multiplexer arrangement is operated to generate a check signal in response to fault current in said impression devices when individually scanned by said scanning circuitry.

9. In a printing machine in accordance with claim 8 in which
said second input means are further connected to said scan circuitry for scanning of said impression devices to cause said multiplexer to generate said check signal in response to fault current in individual ones of said impression devices.

10. In a printing machine in accordance with claim 8 in which
said switch means for operating said multiplexer arrangement is a logic switch operable in response to coded commands from said data processing means operating respectively in response to said non-print signal from said first control means and said check scan signal from said second control means.

11. In a printer apparatus having a plurality of electrically operated impression devices or printing on a record medium,
operating circuit means for each of said impression devices,
a power source,
means connecting said power source to said operating circuit means for supplying electrical energy to said operating circuit means,
control system means operable in a first mode in which said operating circuits means are selectively activated to operate said impression devices to effect printing on a record medium and in a second mode in which said operating circuits are connected to said power source but are not activated by said control means,
control system means for selectively operating said impression devices including means for scanning said operating circuits in predetermined sequence and means for selectively activating said circuit means,
means responsive to said feedback signals from said operating circuit means for checking the validity of operation of said circuit means,
means associated with said operating circuit means for providing feedback signals indicative of the operation of said impression devices or the occurrence of a fault condition in said operating means, and
said control means including means responsive to said feedback signals for serially scanning said operating means for detecting and identifying which operating has a fault condition and thereafter disconnecting said power source from said operating means.

12. A fault location device for a high speed printing having a plurality of hammer operating circuits disposed to be energized by an electrical source and a print control including scanning means for individually addressing said operating circuits, said scanning means having a scan cycle whereby all of said operating circuits are addressed individually, the combination comprising,
circuit means associated with said operating circuits and operable for producing a status signal indicative of current present in any of said operating circuits,
a first control element adapted for receiving control signals and producing print and not-print operating signals for controlling the print and not-print states of said printer,
a second control element adapted for receiving said status signal from said circuit means and a not-print operating signal from said first control element,
said second control element being operable for producing a check scan signal in response to a status signal from said circuit means in combination with a not-print operating signal from said second control element, means responsive to said check scan signal from said second control element for operating said scanning means to address said operating circuits in sequence, means for checking for a status signal from said circuit means with the addresses of said operating circuits during addressing by said scanning means, means responsive to a status signal from said circuit means and an address from said scanning means and for recording a fault indication for the correspondingly addressed operating circuit, means for generating a termination signal in response to the completion of addressing of all of said operating circuits by said scanning means, and means connected to receive said termination signal and disconnect said operating circuits from said electrical source.

13. Fault location apparatus for locating fault current in any of a plurality of print hammer operating circuits of a line printer connectable by a circuit breaker device to a current source comprising in combination, detection means connected with all of said operating circuits and operable for producing a fault signal in response to a fault current generated in any of said operating circuits, test means operable in response to a fault signal from said detection means for operating said detection means to test each operating circuit individually and in sequence in order to provide a fault signal in response to a fault current for any one of said operating circuits, means for recording data for identifying said operating circuits producing a fault signal during testing by said test means, means for operating said circuit breaker to disconnect said current source from said operating circuits upon completion of testing of said operating circuits by said test means.

14. Fault location apparatus for locating fault current in any of a plurality of print hmmmer operating circuits of a line printer connectable by circuit breaker means to a current source comprising in combination, detection means connected with said operating circuits and operable in a first mode for producing a fault signal in response to fault current generated in any of said operating circuits, checking means including scanning means operable in response to a fault signal from said detection means for scanning said detection means in a second mode whereby each operating circuit is checked individually to cause said detection means to produce a fault signal in response to a fault current generated in any one of said operating circuits, said checking means further including means for recording data for identifying said operating circuits producing a fault signal during scanning by said scanning means, and means for operating said circuit breaker means to disconnect said current source from said operating circuits upon completion of scanning of said detection means by said scanning means.

15. Fault location apparatus for locating fault current in any of a plurality of print hammer operating circuits of a line printer connected by circuit breaker means to a current source comprising in combination detection means connected with said operating circuits, means for conditioning said detection means for operation in a first mode for producing a fault signal in response to fault current generated in any of said operating circuits and in a second mode for producing a fault signal selectively in response to fault current generated in particular operating circuits, means operable in response to a fault signal produced by said detection means operating in said first mode for operating said detection means in said second mode for producing fault signals selectively in response to fault current generated in particular operating circuits, recording means responsive to fault signal produced by said detection means operating in said second mode for recording data for identifying said operating circuits generating fault current, and means for operating said circuit breaker means to disconnect said said operating circuits from said current source upon completion of operation of said detection means in said second mode.

16. Fault location apparatus for locating fault current in any of a plurality of operating circuits of a device such as a line printer with a plurality of impactor devices controlled by said operating circuits, said operating circuits being connected by circuit breaker means to a current source, the combination comprising detection means connected with said operating circuits and operable in a first mode for producing a fault signal in response to fault current occurring in any of said operating circuits and in a second mode for producing fault signals selectively in response to fault current generated in particular operating circuits, recording means operable during operation of said detection means in said second mode for recording operating circuit identifying data in response to fault signals produced selectively by operation of said detection means, and means for operating said circuit breaker means to disconnect said operating circuits from said current source upon completion of operation of said detection means in said second mode.

17. Fault location apparatus in accordance with claim 16 in which said detection means includes scan circuitry for individually scanning said operating circuits in said second mode for producing said fault signals selectively, and said recording means includes storage means having storage locations corresponding with said operating circuit locations addressable by said scan circuitry during operation is said second mode for storing said operating circuit identifying data in response to fault signals produced selectively by said detection means.

* * * * *

UNITED STATES PATENT AND TRADEMARK OFFICE
CERTIFICATE OF CORRECTION

PATENT NO. : 4,487,121

DATED : December 11, 1984

INVENTOR(S) : James E. Carrington, John S. Gregor and Gerald R. Westcott

It is certified that error appears in the above—identified patent and that said Letters Patent is hereby corrected as shown below:

In the Claims:

Claim 11, Column 14, Line 44 insert --circuit-- after erating.

Claim 12, Column 14, Line 47 "printing" should read --printer--.

Signed and Sealed this

Eleventh Day of June 1985

[SEAL]

Attest:

DONALD J. QUIGG

Attesting Officer     Acting Commissioner of Patents and Trademarks